April 7, 1936.   J. W. MURRAY   2,036,954
FISHING LURE
Filed May 24, 1935
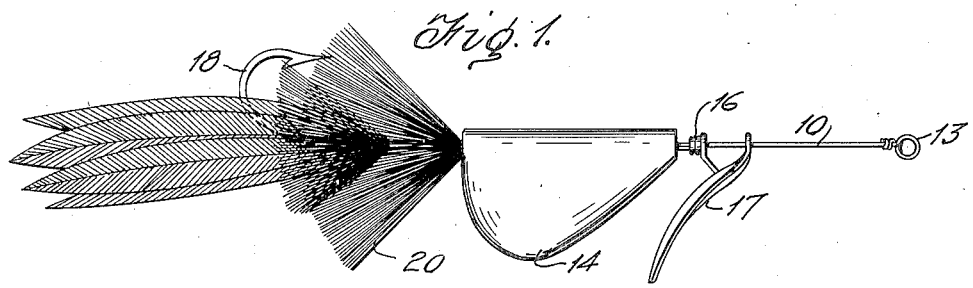
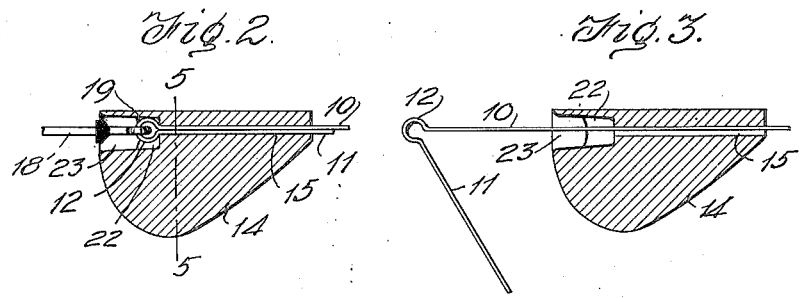
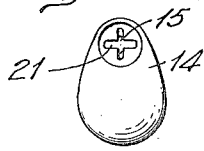 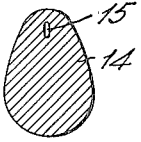 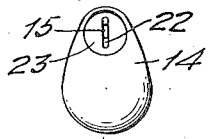
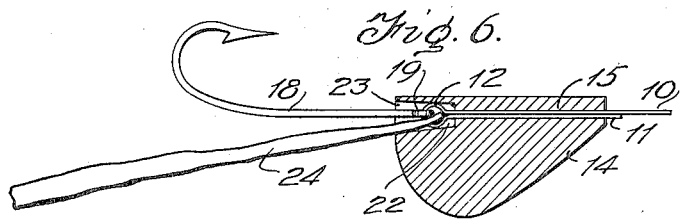
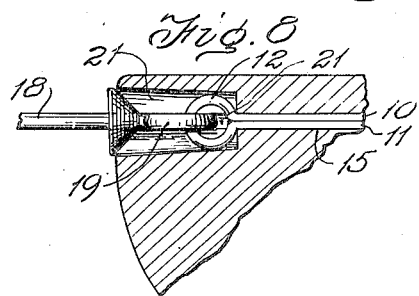
INVENTOR.
John W. Murray,
BY
J. Kaplan
ATTORNEY.

Patented Apr. 7, 1936

2,036,954

UNITED STATES PATENT OFFICE 2,036,954

FISHING LURE

John William Murray, Richmond Heights, Mo.

Application May 24, 1935, Serial No. 23,313

4 Claims. (Cl. 43—42)

This invention relates to fishing lures and has special reference to a weedless fishing lure.

One important object of the invention is to provide a novel form of fishing lure wherein the barb of the hook used with the lure will, when the lure is in use, lie at all times above the shank of the hook and substantially in a vertical plane passing longitudinally of the axis of the shank.

A second important object of the invention is to provide a novel form of such lure wherein arrangement is made for readily attaching and detaching the hook portion of said lure.

A third important object of the invention is to provide a novel form of such lure wherein means are provided for preventing accidental disengagement of the hook portion of the lure from the remainder of the device.

A fourth important object of the invention is to construct a novel form of such lure wherein novel means are provided for holding a pork rind bait.

With the above and other objects in view the invention consists in general of certain novel details of construction and combinations of parts hereinafter fully described, illustrated in the accompany drawing and specifically claimed.

In the accompanying drawing like characters of reference indicate like parts in the several views, and:—

Figure 1 is a side elevation of a complete lure constructed in accordance with this invention.

Figure 2 is a longitudinal vertical section through the body or weight of such a lure and showing certain of the associated parts with the hook held engaged.

Figure 3 is a view similar to Figure 2 but with the device opened and the hook removed.

Figure 4 is a rear end view of one form of body used in such a lure.

Figure 5 is a section on the line 5—5 of Figure 2.

Figure 6 is a longitudinal vertical section through a modified form thereof with certain of the associated parts shown in elevation.

Figure 7 is a rear end view of the body or weight shown in Figure 6.

Figure 8 is an enlarged longitudinal vertical section through the rear part of the body showing the cruciform slot for preventing oscillation of the hook used herewith.

In the embodiments of the invention herein disclosed each form of the lure is provided with a stem or leader having a main portion or shank 10 and a branch portion 11 which is connected to the rear end of the main portion by an arcuate connecting portion 12. This stem or snell is preferably made of thin spring steel wire and the portion 11 may be closed on the portion 10 as in Figure 2 or be allowed to spring away from the main portion as in Figure 3. When the branch 11 is closed on the main portion 10 the connecting part 12 forms a circular eye but, when positioned as in Figure 3, this eye springs open. A line attaching eye 13 is formed at the forward end of the main stem 10.

In connection with this stem there is provided a lure body or weight 14 which is pear shaped in cross section so that the greater mass of the weight is adjacent the bottom. Also the weight is so tapered on its under side from front to rear that its center of gravity lies toward its rear end. The upper part of this weight is substantially straight from front to rear and, in use, lies in an approximately horizontal plane. In the narrow upper part of the weight 14 extends a passage 15 through which passes the main portion or shank 10 and in which may also be received the branch 11. The passage 15 is in the form of a narrow slot just wide enough to fit the wire of the stem closely and of just such depth that the shank and its branch may be received therein. By this means the stem or snell is prevented from rotating in the weight upon the parts being arranged as in Figure 2. The passage 15 is thus a laterally narrow and vertically widened slot fitting the shank and its branch. Under this construction the eye 12 will, when using the lure, lie in a vertical plane. It is to be noted that the weight is slidable longitudinally of the shank 10 and in forward position releases the branch while in rearward position it holds the branch against the shank.

On the forward part of the shank is fixed a bead 16 which is engaged by a spinner 17 of any preferred style and which is mounted for rotation on the shank.

The lure is provided with a hook 18 having an eye 19 which is engageable with the shank by moving the weight forward so that the branch 11 may open as in Figure 3 and thus be slipped through the eye 19 after which the branch 11 is closed on the shank 10 and the weight slipped rearwardly to hold the hook against accidental detachment.

The hook used may be bare as shown in Figure 6 or it may have a suitable dressing like a fly as shown at 20 in Figure 1. Obviously, any character of dressing may be used. In the form shown in Figure 4, the passage 15 terminates rearwardly in a cruciform slot 21 so proportioned that the eye 12 will fit in the vertical part of the slot and the eye 19 in the horizontal part thereof, thus aiding in preventing rotation of the hook in relation to the weight. In the form shown in Figure 7 the passage 15 is vertically enlarged, as at 22, at its rear end and opens into a bore 23. This vertical enlargement aids in preventing turning of hook and the bore 23 serves to permit a strip 24, of pork rind or the like, being hooked on the eye 12.

In any case the barb of the hook will lie uppermost as the lure is drawn through the water and, being in this position, will be unapt to catch weeds. Further, this position of the barb is most favorable for catching a fish when it strikes.

There has thus been provided a simple and efficient device of the kind described and for the purpose specified.

It is obvious that changes may be made in the form and construction of the invention without departing from the material principles involved. It is not, therefore, desired to confine the invention to the exact forms herein shown and described but it is desired to include all forms which come within the scope of the appended claims.

What is claimed is:

1. A fish lure including a length of wire forming a shank and a branch connected at their rear ends by a hook holding eye, said shank having a line attaching eye at its forward end, a weight forming a body and having a longitudinal passage above its center of gravity and extending from the forward end of the weight rearwardly, the shank extending through the passage to permit sliding movement of the weight on said shank and being of such size at its forward portion as to fit closely on the shank and branch when the latter is closed, said passage having its rear end vertically enlarged forming a bore to fit the hook holding eye, a hook provided with an eye, said eye engaging the eye on said shank, and a conical shaped element at the inward termination of said eye, said conical shaped element being adapted to bear against the inner periphery of said bore to keep the hook in alignment with said shank.

2. A fish lure including a length of wire forming a shank and a branch connected at their rear ends by a hook holding eye, said shank having a line attaching eye at its forward end, a weight forming body and having a longitudinal passage above its center of gravity and extending from the forward end of the weight rearwardly on a line parallel to the straight edge of said weight forming body, the shank extending through the passage to permit sliding movement of the weight on said shank and being of such size at its forward portion as to fit closely on the shank and branch when the latter is closed, said passage having its rear end vertically enlarged to fit the hook holding eye, said passage also being enlarged laterally at its rear end to form a bore and a cruciform slot to accommodate the eye of a hook, a hook provided with an eye, said eye engaging the eye of said shank, and a conical shaped element at the inward termination of said eye, said conical shaped element being adapted to bear against the inner periphery of said bore to keep the hook in alignment with said shank.

3. A fish lure including a length of wire forming a shank and a branch connected at their rear ends by a hook holding eye, said shank having a line attaching eye at its forward end, a weight forming a body and having a longitudinal passage above its center of gravity and extending through the forward end of the weight rearwardly, the shank extending through the passage to permit sliding movement of the weight on said shank and being of such size at its forward portion as to fit closely on the shank and branch when the latter is closed, said passage having its rear end vertically enlarged to fit the hook holding eye, said weight having a bore at the rear end of said passage behind the enlarged portion, a hook provided with an eye, said eye engaging the eye on said shank, and a conical shaped element at the inward termination of said eye, said conical shaped element being adapted to bear against the inner periphery of said bore to keep the hook in alignment with said shank.

4. A fish lure including a length of wire forming a shank and a branch connected at their rear ends by a hook holding eye, said shank having a line attaching eye at its forward end, a weight forming a body and having a longitudinal passage above its center of gravity and extending from the forward end of the weight rearwardly, the shank extending through the passage to permit sliding movement of the weight on said shank and being of such size at its forward portion as to fit closely on the shank and branch when the latter is closed, said passage having its rear end vertically enlarged to fit the hook holding eye, said passage also being enlarged laterally at its rear end to form a cruciform slot to accommodate the eye of a hook, said weight having a bore at the rear end of said passage behind the enlarged portion, a hook provided with an eye, said eye engaging the eye on said shank, and a conical shaped element at the inward termination of said eye, said conical shaped element being adapted to bear against the inner periphery of said bore to keep the hook in alignment with said shank.

JOHN WILLIAM MURRAY.